UNITED STATES PATENT OFFICE.

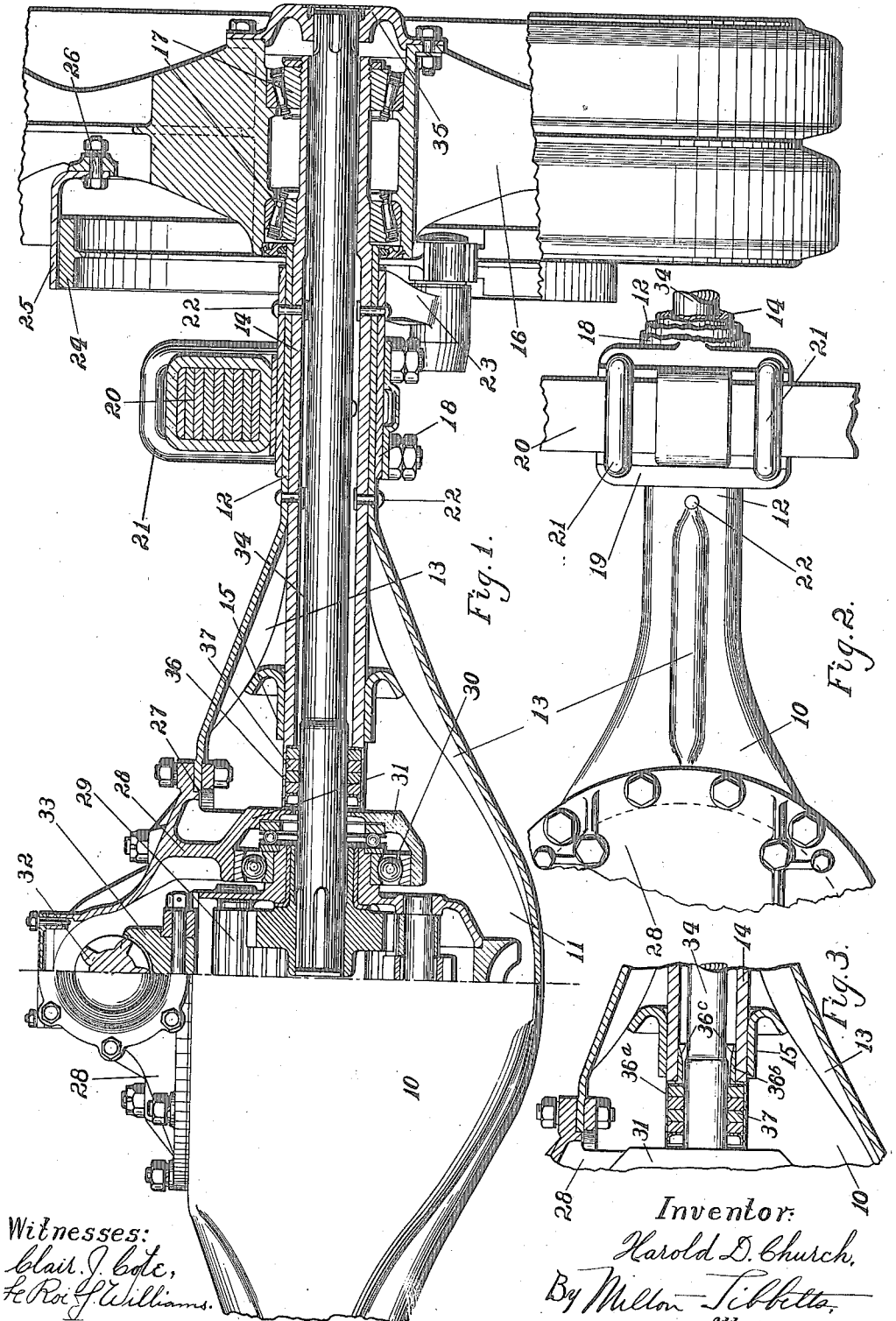

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,187,710.   Specification of Letters Patent.   Patented June 20, 1916.

Application filed August 29, 1913. Serial No. 787,310.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to the axles thereof.

The salient object of the invention is to produce a built-up full-floating type of axle of great strength and of simple construction. This object is attained by forming the axle of pressed steel construction having a central enlarged portion and tubular ends, with the ends reinforced by the inner tube which extends both inwardly and outwardly from said ends. This reinforcing tube is supported at its inner end in the central part of the casing, and the vehicle wheel is mounted upon bearings on the outside of the outwardly extended end.

Another object of the invention is to produce a vehicle driving axle having endwise withdrawable axle sections and washers surrounding the inner ends of the axle sections, in combination with washer supports formed to guide the axle sections to the center of the washers to prevent pushing the washers out of place as the axle sections are assembled.

Other objects and advantages of the invention will appear from the following description, taken in connection with the drawings, which form a part of this specification, and in which, Figure 1 is a vertical sectional view through the right half of a motor vehicle axle constructed in accordance with this invention, the left portion of the axle being shown in elevation; Fig. 2 is a plan view of the right end of the casing and the spring pad, and Fig. 3 is a fragmentary sectional view showing another form of support for the washers.

Referring to the drawings, 10 represents an axle casing which is preferably formed of two steel stampings, electrically or otherwise welded together, and shaped to provide a central enlarged portion or housing 11 and tapering toward ends 12 which are of tubular form. If desired, ribs 13 may be formed in the casing along the tapering portion for the purpose of adding strength thereto.

Within each of the tubular ends 12 is a reinforcing tube 14 which extends both inboard and outboard from said tubular ends. The inner end of the tube 14 is supported in the central portion of the casing by collars 15, which are preferably flanged for attachment, either by welding or riveting, to the tube and casing. The outwardly projecting end of the tube 14 supports the vehicle wheel 16, as by the bearings 17, which are mounted upon the outside of the tube. It will be seen that the above construction places practically all of the strains upon the tube 14, which is comparatively short and may be made of heavy stock. By reason of this reinforcement at the tubular end portion of the casing and its connection to the tube through the collar 15, the casing itself may be of much lighter gage stock than would otherwise be the case.

The tubular portion 12 of the casing may be further reinforced by a sleeve 18, the upper part of which forms the spring pad 19 to which the spring 20 is rigidly secured, as by the clips 21. The tube 14, the tubular portion 12 of the casing, and the sleeve 18, are rigidly and firmly secured together, as by rivets 22, or otherwise. Also the sleeve 18 may have formed upon it or secured to it an arm 23 for supporting the brake shoes 24. These shoes are adapted to operate upon a brake drum 25 properly secured to the wheel 16, as at 26.

In the embodiment of the invention shown, the central portion of the casing is formed with a top opening 27 closed by a cover 28, which supports the entire differential and driving gears. The differential gearing 29 is supported in bearings 30 in two-part lugs 31 extending inwardly from the cover 28, and a worm 32 is supported in suitable bearings in the cover and is adapted to drive a worm wheel 33 secured to the differential housing. Extending in both directions outwardly from the differential are the axle sections 34 which pass entirely through the tubes 14 and the outer ends of which are connected by caps 35 with the wheels 16 for driving the latter.

It will be seen that the inwardly projecting end of the reinforcing tube 14 will to some extent prevent the escape of lubricant from the central part of the casing into the tube, but to further insure against oil passing through the tubes, washers 37 surrounding the axle sections 34 are supported by the inner ends of the tubes 14. In Fig. 1 the tubes 14 are extended inwardly somewhat beyond the collars 15, but are cut away interiorly to a thin wall, as at 36, to receive the washers 37 that surround and fit closely the axle sections 34.

In Fig. 3 the tube 14 stops approximately at the collar 15, and a washer support 36ª, of a tubular form has a contracted portion 36ᵇ, which fits into the end of tube 14. The inner end of the washer support extends to a point very close to the lug 31, and its outer end is flared as shown at 36ᶜ, providing guiding walls to facilitate assembling the axle section 34. By reason of this flared end the axle section may be pushed through the tube 14 and the washers 37 and into its position in the hub of the differential gear without pushing the washers out of place.

A specific embodiment of the invention has been described in detail and will be specifically claimed, but it will be understood that the invention is not limited to the exact details of construction shown, as it will be apparent that changes may be made without departing from the spirit or scope of the invention.

Having thus described my invention, what I claim and desire to secure by Letters Patent is:

1. In a motor vehicle, the combination of an axle having a central enlarged portion and tubular end portions, a reinforcing tube within each of said tubular ends and extending both inwardly and outwardly therefrom, the inner ends of said tubes being cut away interiorly to support washers, supporting collars in the central part of the casing for the inner ends of the tubes, wheels mounted on the outwardly extended ends of said tubes, axle sections extending through said tubes and connected to said wheels, and washers in the cut away ends of said tubes and surrounding said axle sections.

2. In a motor vehicle, the combination of an axle having a tubular portion and an axle section adapted to be inserted in and withdrawn from said tubular portion, of a washer support adjacent the inner end of said tubular portion and washers in said support surrounding and in contact with the axle section, said support having guiding walls for said axle section to prevent displacing the washers as said section is inserted.

3. In a motor vehicle, the combination of an axle having a tubular portion and an axle section adapted to be inserted in and withdrawn from said tubular portion, of a washer support formed separately from and mounted at the inner end of said tubular portion and having a flared end forming guiding walls for the entering end of said axle section, and washers in the inner end of said support and surrounding said axle section.

In testimony whereof I affix my signature in the presence of two witnesses.

HAROLD D. CHURCH.

Witnesses:
 LE ROI J. WILLIAMS,
 H. B. KNAP.